C. E. GILBERT.
CHUCK.
APPLICATION FILED MAY 29, 1919.
1,352,951.
Patented Sept. 14, 1920.
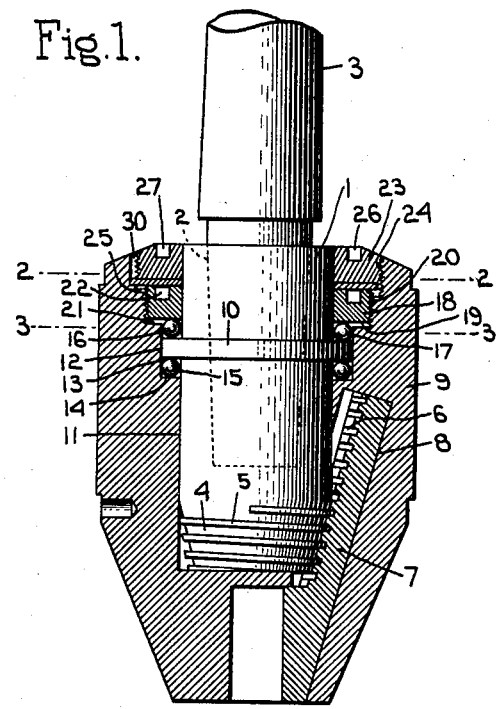
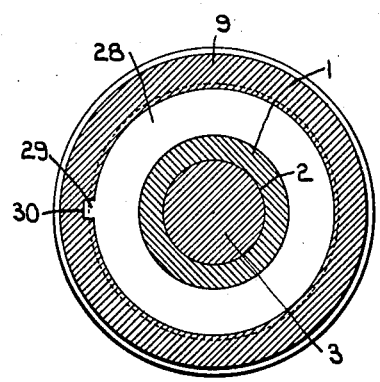
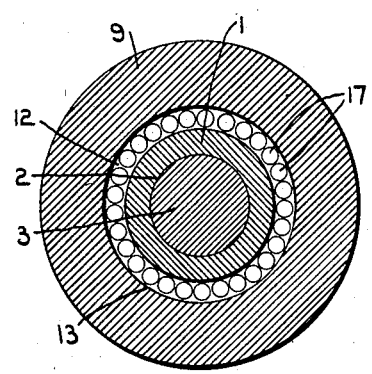
Inventor.
Charles E. Gilbert
by Heard Smith & Tennant.
Attys.

UNITED STATES PATENT OFFICE.

CHARLES E. GILBERT, OF NORTH CHICHESTER, NEW HAMPSHIRE.

CHUCK.

1,352,951.  Specification of Letters Patent.  Patented Sept. 14, 1920.

Application filed May 29, 1919. Serial No. 300,514.

*To all whom it may concern:*

Be it known that I, CHARLES E. GILBERT, a citizen of the United States, residing at North Chichester, county of Merrimack, State of New Hampshire, have invented an Improvement in Chucks, of which the following description, in connection with the accompanying drawing, is a specification, like characters on the drawing representing like parts.

This invention relates to improvements in chucks, and the object thereof is to provide a simple and effective construction by means of which the desired adjustment of the jaws may be secured with a minimum effort, and in which the jaws may be locked effectively upon the material held by them and readily released when it is desired to remove the material from the jaws.

More specifically the object of the invention is to provide a chuck of the character described with oppositely disposed thrust bearings, which will prevent a setting of the jaws when under a working strain and will insure an easy release of the jaws when the article clamped by them is to be removed.

A further object of the invention is to provide a chuck of the character described having oppositely disposed thrust bearings with adjusting means whereby an accurate adjustment of the thrust bearing may be established.

A further object of the invention is to provide locking means for the adjustable member of the thrust bearing, which will prevent the chuck from loosening on its driving head when in operation.

Another object of the invention is to provide a form of chuck in which the members can be made more accurately upon usual machines and in which the proper coöperation of the parts of the chuck will be insured.

Other objects and features of the invention will more fully appear from the following description and the accompanying drawings and will be pointed out in the annexed claims.

A preferred form of chuck embodying my invention is illustrated in the accompanying drawings, in which—

Figure 1 is a vertical, longitudinal, sectional view of the chuck body showing the chuck head and arbor upon which it is carried in elevation, Fig. 2 is a transverse, sectional view on lines 2—2, Fig. 1, Fig. 3 is a transverse, sectional view on lines 3—3, Fig. 1.

The illustrative chuck, shown in the accompanying drawing as embodying my invention, comprises a head 1 of generally cylindrical form having a central conical aperture 2 adapted to receive the usual arbor 3 of the driving shaft. The free end of the head has a conically tapered portion 4 which is provided with the usual screw threads 5 which engage complementary screw threads 6 in jaws 7, which are slidably mounted in converging ways 8, preferably three in number, in the body 9 of the chuck. The cylindrical head 1 also is provided about midway with an integral annular flange 10 forming a member of a compound thrust bearing, which will hereinafter be described. The head thus constructed may be turned upon a usual form of lathe or a screw machine, without the necessity of removing the stock from the machine. Consequently, the flange 10 may be formed with accuracy in respect to the axis of the head.

The chuck body including the guide-ways 8 for the jaws 7 may be of a usual construction, the central cylindrical chamber 11 of the body being constructed to fit upon the cylindrical member 1 of the head. The inner wall of the body of the chuck is provided with an annular recess 12 forming an enlargement of the chamber 11 and presenting a wall 13 and a shoulder 14 adapted to form a race-way for a series of balls 15 adapted to engage the annular flange 10 on the head 2. The recess 12 is of a sufficient area to enable the wall 13 to form the outer boundary of a race-way 16 having a series of balls 17 of a thrust bearing oppositely disposed to the thrust bearing above described. A nut 18 desirably having a flat hardened face 19 adapted to engage the balls 17 and complete the race-way therefor is adjustably mounted in the chuck body 9, preferably having screw threads 20 engaging complementary screw threads in a recess 21 which is concentric with but larger than the recess 12. The nut 18 may be provided with oppositely disposed apertures 22 adapted to receive a spanner for adjusting the nut. Suitable locking means are provided for retaining the nut 18 in adjusted position.

A preferred locking means, which is illustrated herein, comprises a supplementary or locking nut 23 having screw threads 24 engaging complementary threads in the wall of a recess 25, which is concentric with but larger than the recess 21. The screw threads 24 desirably are of opposite pitch to the screw threads 20. The nut 23 may also be provided with recesses 26, 27 to receive a spanner. In order to prevent the movement of the locking nut 23 from disturbing the adjustment of the nut 18, a washer 28 is interposed between the nuts 23 and 18, said washer preferably having a projection or lug 29 engaging a suitable recess 30 in the body member.

By reason of the fact that the chamber for the head, the recess for the ball bearings, and the recesses for the nuts 18 and 23 are concentric they can all be formed in the chuck wall while it remains in the lathe or screw machine in which it is being turned. Consequently, the accuracy of the alinement of the walls of such recesses with the axis of the body is insured, and when the head is assembled therein the axis of the chuck and head will necessarily be coincident and the accuracy of the relation of the ball races to the flange 10 upon the head thus insured. By constructing the chuck in the manner aforesaid all of the parts may be suitably hardened without danger of distortion, so that a chuck will be provided which will wear longer and be of better service than the usual form of chuck in which some of the parts remain necessarily in an unhardened condition.

The thread of the chuck jaws preferably is concave and fits closely the tapered portion 4 of the end of the head 2, so that torsional strain upon the screw threads is avoided. The oppositely disposed ball bearings insure an easy release of the chuck jaws and prevent the setting of the jaws under a working strain. The right and left hand adjusting nuts with a lock washer between allow an accurate adjustment of the thrust bearing of the driving cone and also prevent the chuck from being loosened by strain when in operation. The members of the chuck are so constructed that they may be made with a minimum number of operations, and, as above stated, are so designed that when assembled accurate coöperation will be insured.

It will be understood that the embodiment of my invention disclosed herein is of an illustrative character and that various changes may be made within the meaning and scope of the following claims.

Having thus described my invention what I claim as new and desire to secure by Letters Patent is:

1. A chuck comprising a head having a tapered screw threaded end, an inclosing integral body portion having converging guide-ways, jaws slidably mounted in said guide-ways having threaded faces engaging the screw threads of said head, oppositely disposed thrust bearings intermediate of said head and body comprising an integral flange on said head, a complementary recess in said body, balls in said recess on opposite sides of said flange, and an adjustable nut engaging one set of balls and with the walls of the recess forming a race-way therefor.

2. A chuck comprising a head having a tapered screw threaded end, an inclosinig body portion having converging guide-ways, jaws slidably mounted in said guide-ways having threaded faces engaging the screw threads of said head, oppositely disposed thrust bearings intermediate of said head and body comprising an integral annular flange on said head, a complementary recess in said body, balls in said recess on opposite sides of said flange, an adjustable nut engaging one set of said balls, and a locking nut having threaded engagement with said body, the threads of said locking nut being of opposite pitch to those of the ball engaging nut.

3. A chuck comprising a head having a tapered screw threaded end, an inclosing body portion having converging guide-ways, jaws slidably mounted in said guide-ways having threaded faces engaging the screw threads of said head, oppositely disposed thrust bearings intermediate of said head and body comprising an integral annular flange on said head, a complementary recess in said body, balls in said recess on opposite sides of said flange, an adjustable nut engaging one set of said balls, and a locking nut having threaded engagement with said chuck, the threads of said locking nut being of opposite pitch to those of the ball engaging nut, a washer intermediate of said ball engaging nut and said locking nut, and means for preventing the rotation of said washer.

4. A chuck comprising a head having a cylindrical portion provided with an annular flange and a tapered screw threaded end, an inclosing integral body portion having a central cylindrical chamber fitting the cylindrical portion of said head and forming a bearing therefor, and an annular recess to receive said flange, the walls of said recess presenting ball race-ways on opposite sides of said flange, balls in said race-ways, and a nut having screw threaded engagement with said body portion engaging one of said sets of balls.

5. A chuck comprising a head having a cylindrical portion provided with an annular flange and a tapered screw threaded end, an inclosing body portion having a central cylindrical chamber fitting the cylindrical portion of said head and forming a bearing therefor, and an annular recess to receive said flange, the walls of said recess presenting ball race-ways on opposite sides of said flange, a ball engaging nut of larger diameter than said race-way, having screw threaded engagement with said body serving to complete one of said race-ways, and a locking nut of larger diameter than said ball engaging nut, provided with screw threads of opposite pitch from those of the ball engaging nut, and a washer intermediate of said nuts having an extension projecting into a recess in said body.

In testimony whereof, I have signed my name to this specification.

CHARLES E. GILBERT.